Oct. 9, 1928.
J. H. HAMMOND, JR., ET AL
1,686,854
ODOMETER
Original Filed July 13, 1921   2 Sheets-Sheet 1
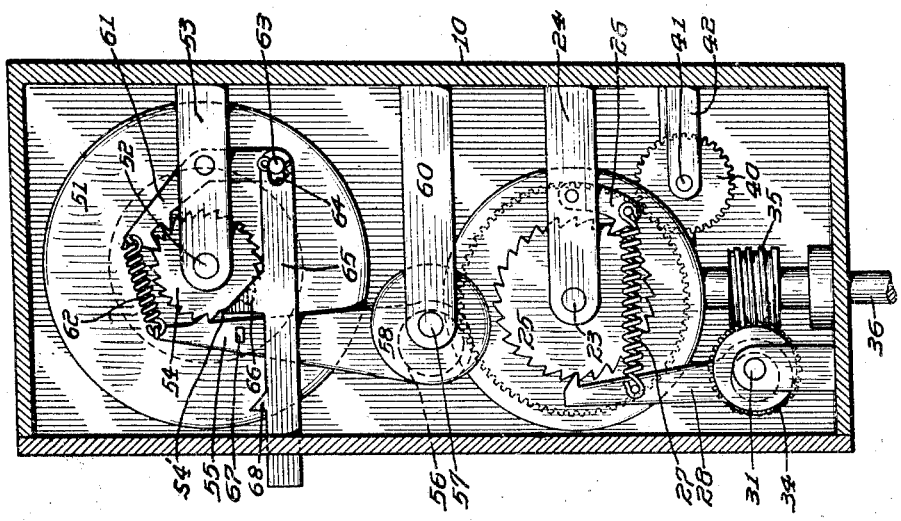
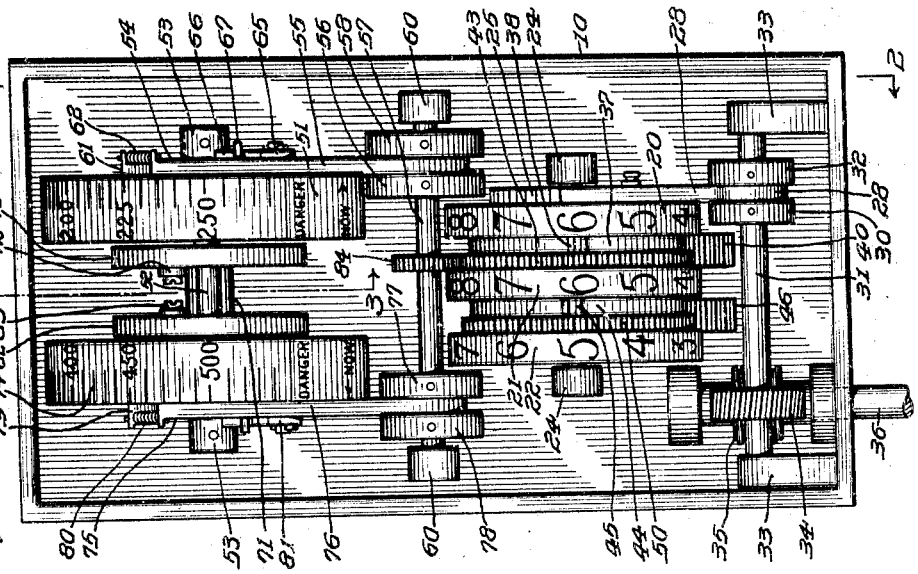
INVENTORS
John Hays Hammond Jr.
Albert D. Trenor.
WITNESS
F.J. Hartman
BY
A.J. Gardner. ATTORNEY Oct. 9, 1928.
J. H. HAMMOND, JR., ET AL
1,686,854
ODOMETER
Original Filed July 13, 1921    2 Sheets-Sheet 2
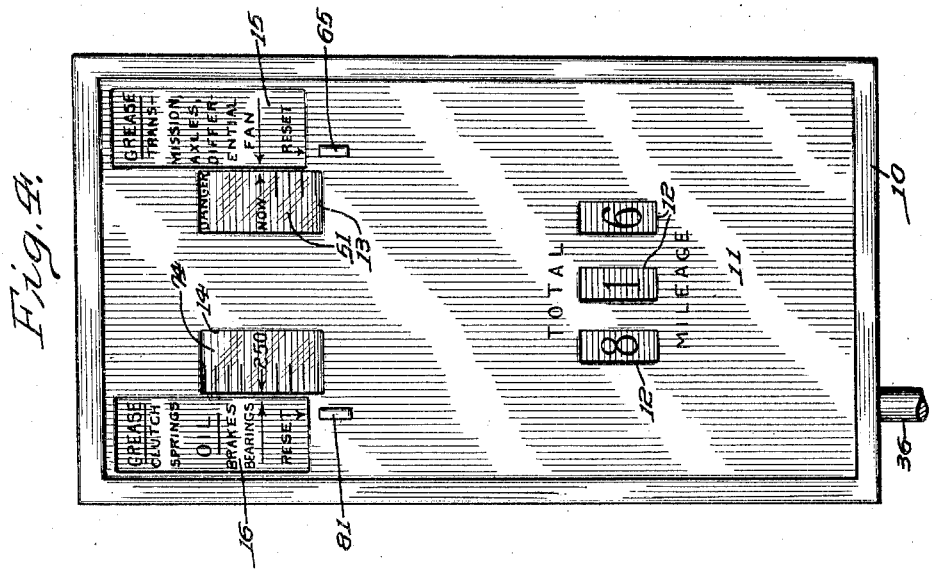
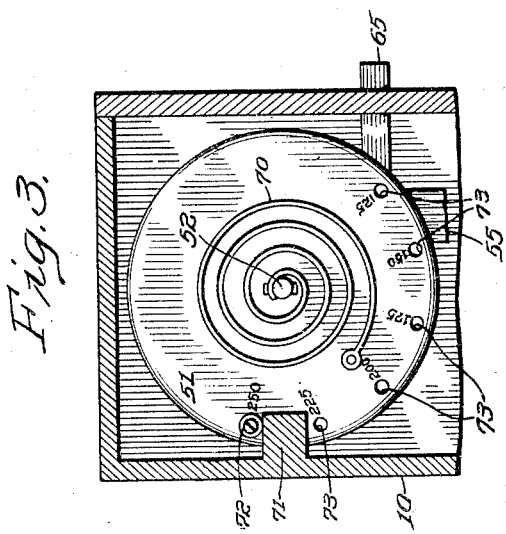
INVENTORS
John Hays Hammond Jr.
Albert D. Trenor.
WITNESS            BY
ATTORNEY Patented Oct. 9, 1928.

1,686,854

UNITED STATES PATENT OFFICE.

JOHN HAYS HAMMOND, JR., OF GLOUCESTER, MASSACHUSETTS, AND ALBERT D. TRENOR, OF NEW YORK, N. Y.; SAID TRENOR ASSIGNOR TO SAID HAMMOND.

ODOMETER.

Application filed July 13, 1921, Serial No. 484,379. Renewed April 3, 1926.

Some of the objects of the present invention are to provide an automobile or other motor vehicle with means for indicating which parts of the vehicle's mechanism require grease or oil after traveling a number of miles; to provide means for separately indicating different groups of a vehicle's parts requiring attention after different periods of mileage; to provide means for automatically setting a danger signal or signals when a certain predetermined number of miles is exceeded whereby the user of the automobile or other vehicle is notified which parts require lubrication; and to provide other improvements as will hereinafter appear.

In the accompanying drawings, Fig. 1 represents a front elevation of an indicating instrument embodying one form of the present invention, the front cover plate being removed; Fig. 2 represents a section on line 2—2 of Fig. 1; Fig. 3 represents a sectional detail on line 3—3 of Fig. 1; and Fig 4 represents a front elevation of the instrument with the cover in place.

Referring to the drawings, one form of the present invention comprises an instrument case 10 having a front cover plate 11 provided with openings 12 through which numbers representing mileage are visible. Other openings 13 and 14 are provided in the plate 11 to make visible certain indicia related to mileage, one of said openings, say 13, being arranged beside a plate 15 fixed to the cover 11 and having certain data thereon relative to parts of the particular mechanism requiring attention. These data are here shown as relating to automobile parts and comprise a list of those parts requiring attention at or about the same time. The other opening 14 is likewise arranged with respect to a plate 16 having other parts indicated thereon.

Within the instrument case 10 and in register with the respective openings 12 are three dial wheels 20, 21 and 22 having consecutive numbers from 0 to 9 respectively arranged upon their peripheries, one wheel, as 20, serving as a unit dial wheel; another, 21, serving as a tens dial wheel; and the third, 22, serving as a hundreds dial wheel. In operative assembled condition the dial wheels 20, 21 and 22 are arranged to respectively have one number visible through the openings 12, and as here shown in Fig. 4 the numbers 8, 1 and 6 are visible, indicating that the mileage of the vehicle has been 816 miles. All of the aforesaid dial wheels are loosely mounted upon a common fixed spindle 23, which is supported in brackets 24 from the case 10, and in the initial position zero on each is visible through the openings 12.

In order to turn the unit wheel 20, it is secured to a ratchet wheel 25 which is freely rotatable upon the spindle 23 and is normally held fixed by a pawl 26, pivoted to the bracket 24, under the action of a spring 27 which also retains an operating pawl 28 in engagement with the ratchet 25. In the present construction the pawl 28 is carried by an eccentric 30 pinned or otherwise made fast to a shaft 31, while an eccentric collar 32 serves to prevent the pawl 28 from slipping off the eccentric 30. The shaft 31 is suitably journalled in bearing supports 33 and motion is transmitted thereto by means of a worm wheel 34 fast to the shaft 31 and in mesh with a worm 35 which is rigidly secured to a shaft 36 projecting from the instrument case 10 where it connects with any suitable flexible shaft (not shown) arranged to be driven from the wheels or transmission of an automobile in any well known manner and similar to that used with standard speedometers.

In order to turn the tens dial 21 at the definite required intervals the unit dial wheel 20 is rigidly secured to an intermittent gear 37 having two teeth 38 arranged to mesh at each revolution with a gear 40 loosely mounted upon a fixed shaft 41 carried by brackets 42 from the casing 10. The gear 40 is in mesh with a gear 43 loose upon the spindle 23 but fast to the tens dial wheel 21. Thus, at each revolution of the intermittent gear 37, the teeth 38 mesh with the gear 40 and cause it to turn the gear 43 through that portion of a revolution required to advance the dial wheel 21 from one index number to the next.

For causing the hundreds dial wheel 22 to be turned at the definite required intervals, a similar mechanism is provided, including an intermittent gear 44 rigidly secured to the dial wheel 21 and having two teeth 45 arranged to mesh, at each revolution, with a gear 46 loosely mounted upon the shaft 41. This gear is in mesh with a gear 50 fixed to the hundreds dial wheel 22 and loose upon the spindle 23. The foregoing is one form of standard mechanism used in odometers and need not be more fully described here.

In order to display certain indicia relating to mileage through the opening 13, there is a dial wheel 51 provided having a series of graduations on its periphery numbered here from "zero" to "250", the zero mark being located adjacent other indicia, such as the word "Now", while between "250" and "Now" is a red line marked "Danger" or other equivalent sign. This dial wheel 51 is loosely mounted upon a rigid shaft 52 which is supported in suitable brackets 53 and also carries loosely thereon a ratchet 54 to which the dial wheel 51 is rigidly made fast in any suitable manner. The ratchet wheel 54, in the present instance, has two teeth missing, as indicated at 54', for a purpose to be presently described.

For causing the dial wheel 51 to be intermittently turned through a part of a revolution, the ratchet 54 is arranged to be engaged and operated by a pawl 55 which is mounted upon an eccentric 56 fast upon a shaft 57 and held in position by a collar 58 pinned to the shaft 57. The shaft 57 is suitably journalled in brackets 60 carried by the case 10. The ratchet 54 is also arranged to be engaged by a double tooth pawl 61, which is pivoted to the bracket 53 and held in engagement with the ratchet 54 by a spring 62 which also serves to hold the pawl 55 in operative relation. From the foregoing it will be evident that rotation of the shaft 57 will actuate the pawl 55 once every revolution so that the dial wheel 51 is turned through a predetermined portion of a revolution to change the mileage indicia in the desired manner.

As a means for releasing the dial wheel 51 and return it to its zero position, the pawl 61 has a pin 63 fixed to the end opposite to the teeth, this pin 63 seating in a slot 64 in a laterally movable bar 65 which has a finger 66 arranged to engage a lug 67 rigidly secured to the pawl 55. The construction is such that when the bar 65 is pulled outwardly, that is to the left as seen in Fig. 2, the pawl 61 will be withdrawn from the ratchet 54 and the finger 66 will engage the lug 67 and thereby swing the pawl 55 away from the ratchet 54. The dial wheel 51 is therefore free to turn independently of its actuating means, a stop 68 serving to limit the movement of the bar 65.

A spiral spring 70 is fixed at one end to the shaft 52 and at its other end to the dial wheel 51, the arrangement being such that the spring 70 returns the dial wheel 51 to its initial position when the actuating means are released. This initial position is determined by a fixed stop 71 upon the case 10 and projecting into the path of a rubber or otherwise cushioned projection 72 removably secured to the dial wheel 51. A number of openings 73 are preferably provided in the face of the dial wheel 51, in any one of which the projection 72 may be secured. These openings 73 are spaced to represent certain mileage, say from two hundred and fifty miles to 125 miles, the intervals being 25 miles, and corresponding numbers are located respectively adjacent each of the openings so that by changing the projection 73 from one opening to another the indicator can be correctly calibrated for different conditions in different automobiles.

In order to display certain indicia relating to mileage through the opening 14, there is a dial wheel 74 provided having a portion of its periphery arranged to be visible through the opening 14, the said periphery having a series of graduations numbered similarly to the dial wheel 51, except that the numbers are twice those shown on dial wheel 51, and run from "zero" to "500". The zero is indicated by the word "Now" while preferably half way between this word "Now" and the "500" mark there is the word "Danger". The actuating means for this dial wheel 74 is similar to that described for the dial wheel 51, the parts being as follows: A ratchet 75 loosely mounted upon the shaft 52 but rigidly secured to the dial wheel 74; a pawl 76 carried by an eccentric 77 and held by a collar 78; the eccentric being fast upon the shaft 57; a second pawl 79 and a spring 80 connecting the two pawls 76 and 79; the release of the ratchet 75 is similar to that heretofore described, being controlled by a bar 81; the dial wheel 74 is returned to zero by a spiral spring 82; and a cushioned projection 83 is adjustably carried by the dial wheel 74 to engage the fixed stop 71. There is this difference, however, between the two dial wheel actuating means, namely the eccentric 77 has a different throw from the eccentric 56 and as a consequence the motion of the pawl 76 is such that each time it reciprocates it engages but one tooth of the ratchet 75, thereby moving the dial wheel 74 through the angular distance equal to the angle subtended by one tooth. The motion imparted to the pawl 55, however, is such that it passes over two teeth of the ratchet 54 each time it is reciprocated, and therefore rotates the dial 51 through an angular amount equal to the angle between two teeth. It is therefore evident that the dial wheel 51 will move twice as rapidly as the dial wheel 74.

For rotating the shaft 57, a gear 84 is provided, fast to the shaft 57 and in mesh with the gear 43 of the tens dial 21 so that for every hundred miles travelled by the machine the gear 43 will make one revolution while the gear 84, through the gear ratio, will make four complete revolutions, or twenty-five miles for each revolution. This causes the pawls 55 and 76 to be reciprocated once every twenty-five miles, one pawl 55 having a longer stroke as already explained.

In the operation of this form of the invention, the shaft 36 is rotated in a well known manner as the automobile travels, the motion of the shaft 36 being transmitted by the worm 35 and worm wheel 34 to the shaft 31 to reciprocate the pawl 28 once every revolution. The action of the pawl 28 is to rotate the ratchet 25, one tooth at a time, and thereby cause the units dial 20 to be rotated step by step in a counter-clockwise direction, as seen in Fig. 2, thus bringing the numbers on the dial 20 consecutively into register with the first of the openings 12. The gear ratios are so proportioned that when the automobile has travelled one mile, the dial 20 will be moved from one number to the next following. When the dial 20 moves for the tenth mile, the teeth 38 mesh with the gear 40 and cause the latter to rotate a fraction of a revolution while the teeth are in mesh. The movement of the gear 40 is directly transmitted to the gear 43 which turns the tens dial 21 through an amount sufficient to bring the next succeeding number into register with the second of the openings 12. In the same manner, every complete revolution of the dial 21 causes the hundreds dial 22 to move the distance of one number, in this case the mutilated gear 44, gear 46 and gear 50 are operated.

Each revolution of the gear 43 causes the gear 84 to rotate the shaft 57 four complete revolutions and as a result the pawls 55 and 76 are reciprocated once every twenty-five miles, the former turning the dial wheel 51 an angular amount equal to the angle between two ratchet teeth, while the latter turns the dial wheel 74 an angular amount equal to the angle subtended by one tooth of the ratchet. It is, therefore, evident that the dial wheel 51 will move twice as rapidly as the dial wheel 74. The gear ratios, eccentricities, and number of teeth in the two ratchets are so proportioned that when the machine has travelled 250 miles the dial wheels 51 and 74 will move from the positions shown in Fig. 1 to the position shown in Fig. 4. If the dial wheel 51 continues to rotate past the position where the word "Now" is opposite the arrows, it will gradually bring the word "Danger" into view. When this word reaches the arrows the ratchet 54 will have moved to such a position that the next stroke of the pawl 55 will merely move in the space 54' where the two teeth are missing and the dial wheel 51 will cease to move and the word "Danger" will remain visible through the opening 13.

A corresponding action happens with respect to the dial wheel 74 when it has rotated a sufficient distance to bring the word "Danger" into register with the opening 14.

When the parts of the machine indicated upon the plate 15 have been attended to, the bar 65 is pulled outward, or to the left as shown in Fig. 2, thereby rotating the double tooth pawl 61 in a clockwise direction to release it from the ratchet 54. At the same time the finger 66 picks up the lug 67 and causes the pawl 55 to be disengaged from the ratchet 54. This leaves the ratchet 54 and the dial 51 free to return under the action of the spiral spring 70 until the cushioned projection 72 strikes the stop 71. The dial 51 and its parts are now again in their zero or initial position with the number "250" visible, thus indicating the machine can again run two hundred and fifty miles before it is again necessary to give the parts, indicated on the plate 15, attention. The projection 72 having a rubber or other cushioning material thereon breaks the shock or impact and prevents damage to the parts.

A similar operation takes place with respect to the dial wheel 74 when it has reached the position with the word "Now" visible and opposite the arrow on the plate 16. When the parts, indicated on the plate 16, have been attended to, the bar 81 is pulled outward to release the ratchet 75 and the spring 82 thereupon functions to return the dial 74 to its initial position, with the cushioned stop 83 resting upon the stop 71. In this position the number "500" will be opposite the arrow on the plate 16 showing the machine can run five hundred miles before these particular parts again require attention.

By varying the position of the cushioned projections 72 and 83 upon the respective dial wheels 51 and 74 the mileage for the two sets of dials can be varied at will to suit the particular conditions of any make of automobile. Thus, for example, if a machine required attention after two hundred miles, the stop would be placed in the opening 73 corresponding to that mileage, and so within any suitable limits the distance travelled may be varied upon the dial indicating mechanism.

Having thus described our invention, we claim:

1. In an indicating device for motor vehicles, the combination of an odometer, a movable indicator, a step by step mechanism including a ratchet wheel having a predetermined number of its teeth cut away arranged to operate said movable indicator, means operated by said odometer for intermittently actuating said step by step mechanism, and a plurality of indicia showing the parts of the vehicle requiring lubrication located in operative relation to said movable indicator.

2. In an indicating device for motor vehicles, the combination of an odometer, a movable indicator, a step by step mechanism including a ratchet wheel having a predetermined number of its teeth cut away arranged to operate said movable indicator, means operated by said odometer for intermittently actuating said step by step mechanism, a plurality of indicia showing the parts of the vehicle requiring lubrication located in operative relation to said movable indicator, and means for resetting said movable indicator in its initial position.

3. In an indicating device for motor vehicles, the combination of an odometer, a movable indicator, a step by step mechanism including a ratchet wheel having a predetermined number of its teeth cut away arranged to operate said movable indicator, means operated by said odometer for intermittently actuating said step by step mechanism, a plurality of indicia showing the parts of the vehicle requiring lubrication located in operative relation to said movable indicator, and means for releasing said step by step mechanism for resetting said movable indicator.

4. In an indicating device for motor vehicles, the combination of an odometer, a movable indicator, a step by step mechanism including a ratchet wheel having a predetermined number of its teeth cut away arranged to operate said movable indicator, means operated by said odometer for intermittently actuating said step by step mechanism, a plurality of indicia showing the parts of the vehicle requiring lubrication located in operative relation to said movable indicator, means for releasing said step by step mechanism, and means automatically operative upon the release of said step by step mechanism for resetting said movable indicator in its initial position.

5. In an indicating device for motor vehicles, the combination of an odometer, a movable indicator having a signal thereon, means including a ratchet wheel having a predetermined number of its teeth cut away and a reciprocable pawl engaging the teeth of said ratchet wheel for causing said indicator to move step by step, means operated by said odometer for periodically actuating said pawl means, and a plurality of indicia showing the parts of the vehicle requiring lubrication located adjacent said indicator in a position to cooperate with said signal.

6. In an indicating device for motor vehicles, the combination of an odometer, a plurality of movable indicators, separate means for imparting a step by step movement to each indicator differently characterized for each indicator to impart a different degree of movement thereto, a plurality of indicia adjacent each indicator, each set of indicia showing different parts of the vehicle requiring lubrication, and means operated by said odometer for periodically actuating said indicators.

7. In an indicating device for motor vehicles, the combination of an odometer, a pair of rotatably mounted indicators, means for imparting a step by step movement to one of said indicators, means for imparting a different step by step movement to the other of said indicators, common means operated by said odometer for periodically actuating both step by step means, and a plurality of indicia adjacent each indicator and arranged to cooperate therewith to indicate parts of the vehicle requiring lubrication after certain mileage.

8. In an indicating device for motor vehicles, the combination of an odometer, a pair of rotatably mounted indicators each arranged to initially indicate a predetermined maximum mileage, means operated by said odometer for gradually decreasing the indicated mileage of said indicators at different rates respectively, and two sets of indicia showing parts requiring lubrication operatively arranged with respect to the respective indicators.

9. An indicating device for motor vehicles comprising an odometer, a stationary indicator identified with some matter in relation to the vehicle requiring attention, a step-by-step mechanism, a mileage indicator controlled by said step-by-step mechanism and arranged to register with said stationary indicator, an eccentric geared to the odometer, and a pawl operatively connected to the eccentric for actuating the step-by-step mechanism.

10. An indicating device for motor vehicles comprising an odometer, a stationary indicator identified with some matter in relation to the vehicle requiring attention, a step-by-step mechanism, a mileage indicator controlled by said step-by-step mechanism and arranged to register with said stationary indicator, an eccentric geared to the odometer, means associated with said eccentric for actuating said step-by-step mechanism, and means for resetting said step-by-step mechanism to its original position.

11. In an indicating instrument, a graduated rotary member for indicating the extent of movement of a mechanism, a movable signal carrying element, a ratchet wheel operatively connecting with said signal carrying element and having a predetermined number of its teeth cut away, a pawl operatively connected to said rotary member and engaging the teeth of said ratchet wheel for rotating the signal carrying element through a limited extent of movement, means registering with the signal carrying element to indicate parts to be lubricated, and means for resetting the signal element.

12. In an indicating device for motor vehicles, the combination with an odometer for indicating the extent of movement of the vehicle, said odometer including a graduated rotary member for indicating the extent of movement of the vehicle in units of linear measurement and other rotary members for indicating the extent of movement of the vehicle in multiples of said units of measurement, a gear wheel secured to one of said last-named rotary members, of means for indicating special information with respect to the vehicle including an auxiliary shaft geared to said odometer gear wheel, an eccentric mounted on said shaft, a pawl reciprocated by rotary movement of said eccentric, a ratchet wheel engaged by said pawl and having at least two of its teeth cut away, and an indicia wheel operatively connected to said ratchet wheel.

13. In an indicating device for motor vehicle the combination with an odometer for indicating the extent of movement of the vehicle, said odometer including a graduated rotary member for indicating the extent of movement of the vehicle in units of linear measurement and other rotary members for indicating the extent of movement of the vehicle in multiples of said units of measurement, a gear wheel secured to one of said last-named rotary members, of means for indicating special information with respect to the vehicle including an auxiliary shaft geared to said odometer gear wheel, an eccentric mounted on said shaft, a pawl reciprocated by rotary movement of said eccentric, a ratchet wheel engaged by said pawl and having at least two of its teeth cut away, an indicia wheel operatively connected to said ratchet wheel, and means for resetting said ratchet wheel and said indicia wheel.

14. An indicating device for vehicles comprising in combination an odometer for indicating the extent of movement of the vehicle in units of linear measurement and including a toothed rotary element operable at a relatively slow speed with respect to the rate of movement of the vehicle, a second toothed element in mesh therewith and arranged to drive an auxiliary shaft, a plurality of variously characterized eccentrics mounted on said shaft each arranged to reciprocate a pawl, a ratchet wheel engaged by each of said pawls, each ratchet wheel having at least two of its teeth cut away, and a signal carrying element operated by each ratchet wheel.

15. An indicating device for vehicles comprising in combination an odometer for indicating the extent of movement of the vehicle in units of linear measurement and including a toothed rotary element operable at a relatively slow speed with respect to the rate of movement of the vehicle, a second toothed element in mesh therewith and arranged to drive an auxiliary shaft, a plurality of variously characterized eccentrics mounted on said shaft each arranged to reciprocate a pawl, a ratchet wheel engaged by each of said pawls, each ratchet wheel having at least two of its teeth cut away, a signal carrying element operated by each ratchet wheel, and means for resetting said ratchet wheels to normal.

Signed at Gloucester, in the county of Essex, and State of Massachusetts, this 1st day of July, 1921.

JOHN HAYS HAMMOND, Jr.

Signed at Gloucester, county of Essex, and State of Massachusetts, this 1st day of July, 1921.

ALBERT D. TRENOR.